United States Patent [19]

Sickles

[11] 4,120,017
[45] Oct. 10, 1978

[54] DETACHABLE POWER SUPPLY FOR INDUCTION TYPE ELECTROSTATIC SPRAY GUN

[75] Inventor: James E. Sickles, Glenshaw, Pa.
[73] Assignee: PPG Industries, Inc., Pittsburgh, Pa.
[21] Appl. No.: 739,170
[22] Filed: Nov. 5, 1976
[51] Int. Cl.$^2$ ............................................... B05B 5/02
[52] U.S. Cl. .................................. 361/228; 361/235; 239/15
[58] Field of Search ...................... 239/3, 15; 361/227, 361/228, 229, 235

[56] References Cited

U.S. PATENT DOCUMENTS

| | | | |
|---|---|---|---|
| 2,302,289 | 11/1942 | Bramston-Cook | 239/3 |
| 3,731,145 | 5/1973 | Senay | 239/15 X |
| 4,004,733 | 1/1977 | Law | 239/15 X |
| 4,033,506 | 7/1977 | Braun | 239/15 |

FOREIGN PATENT DOCUMENTS 387,744 6/1973 U.S.S.R. ..................... 239/15

*Primary Examiner*—Robert W. Saifer
*Attorney, Agent, or Firm*—J. Timothy Keane

[57] ABSTRACT

A light-weight, portable power pack for supplying a high voltage output to an electrostatic spray gun from a low voltage input is disclosed. The power pack is mounted on and forms a part of the spray gun and is detachable therefrom for replacement purposes. The power pack comprises a voltage multiplier circuit for converting a low voltage DC to a high voltage DC for induction charging of material discharged from the spray gun, the circuit being encapsulated in an epoxy resin material to provide a suitable mounting case therefor. The case is molded into a suitable shape and is attached, in one embodiment, to the bottom portion of the barrel of the gun by means of screws, bolts or the like, the power pack being provided with external contacts which serve to engage corresponding contacts on the spray gun to provide electical contact through the gun to the power source, which may be a battery pack carried by the operator, and to the inductive charging device for the spray gun. In another embodiment, the power pack may be mounted upon a detachable accessory such as a gas shroud forming chamber which is in turn mountable on the forward end portion of the spray gun barrel.

15 Claims, 8 Drawing Figures

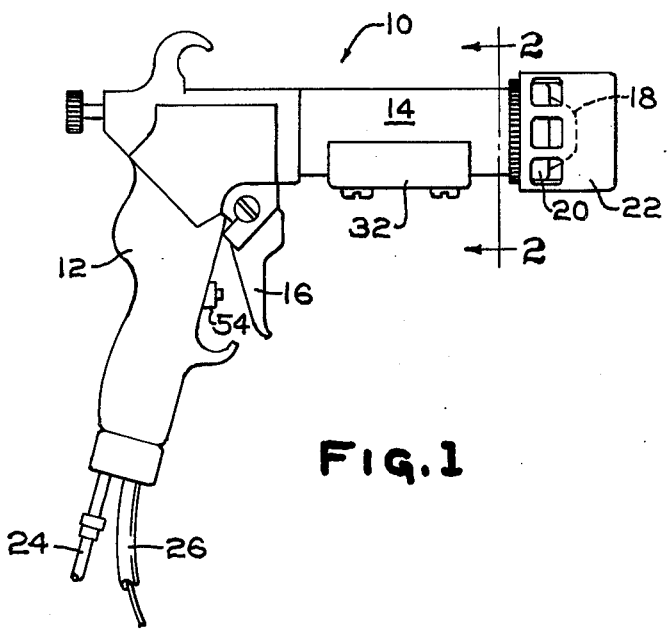
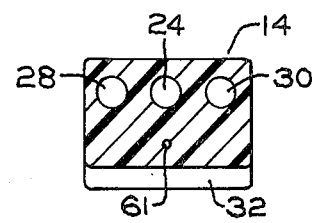
FIG.1  FIG.2
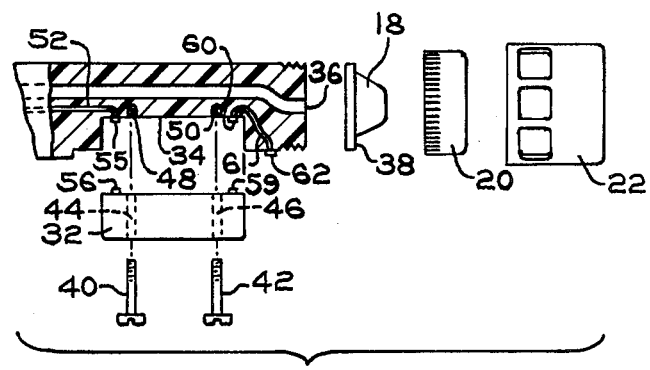
FIG.3
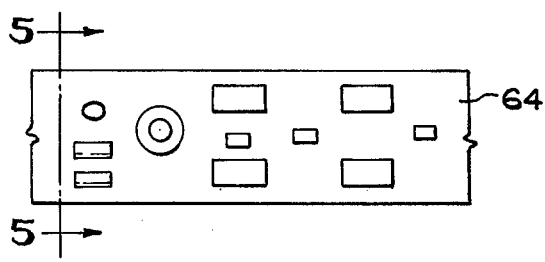
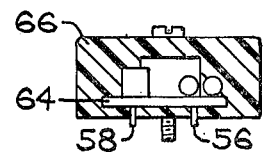
FIG.4  FIG.5

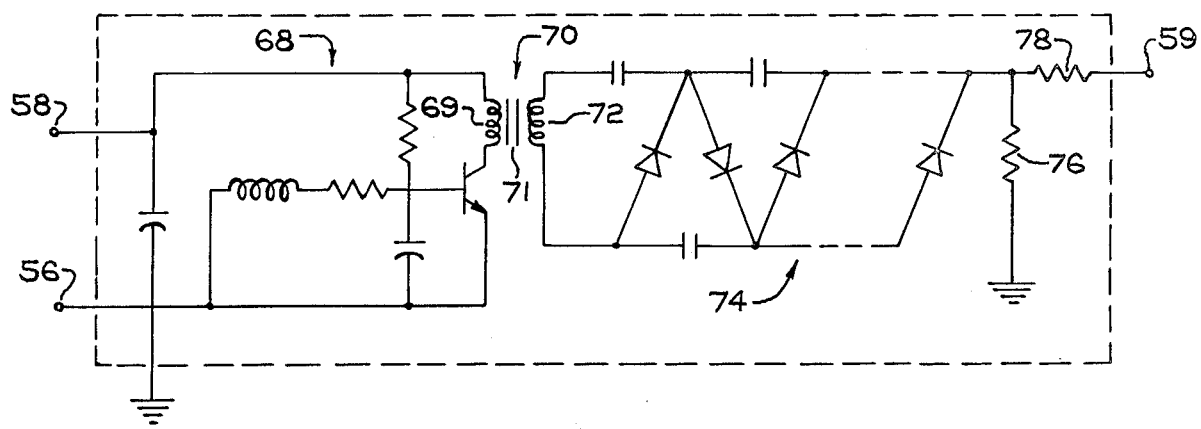
Fig. 6
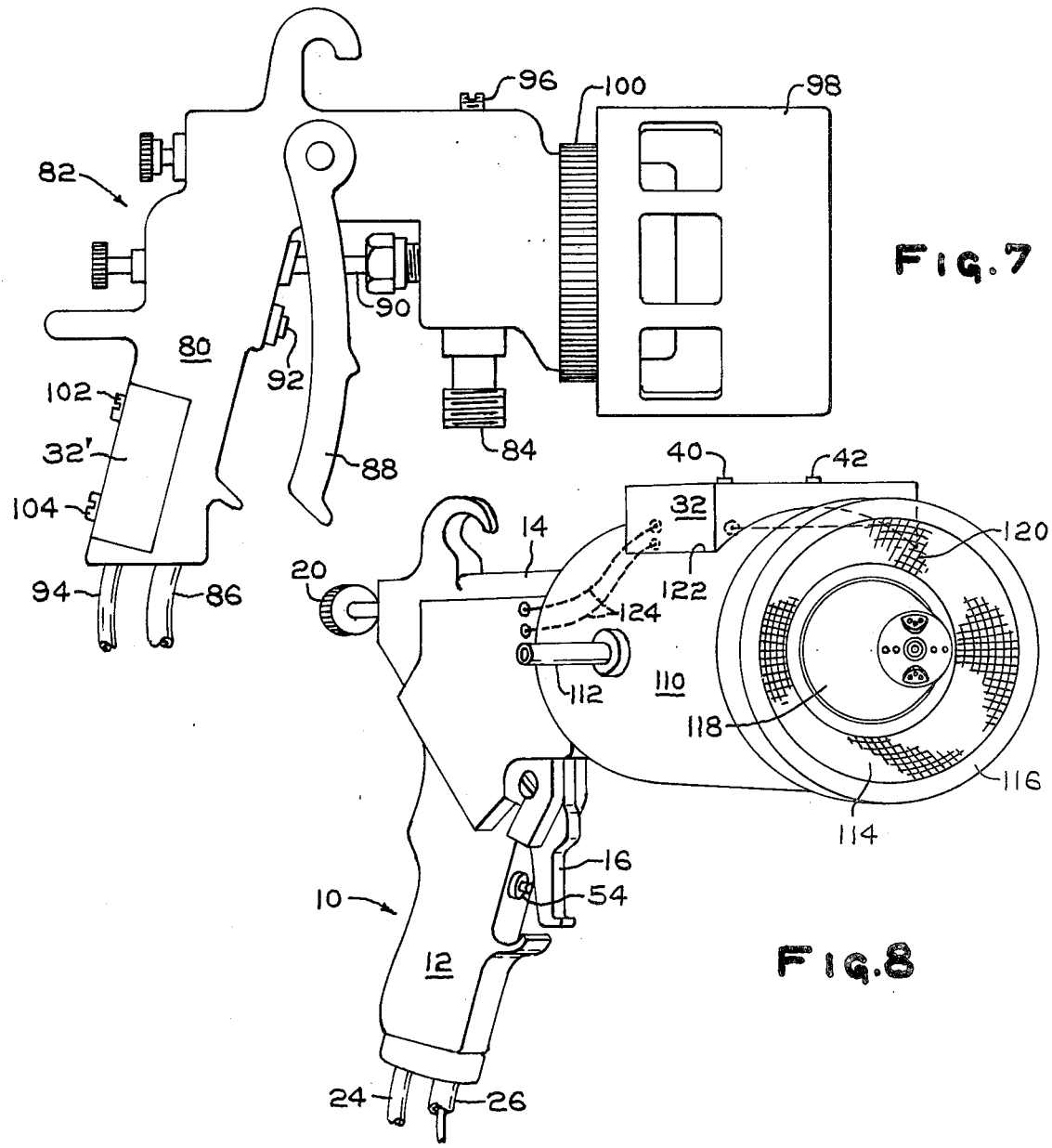
Fig. 7
Fig. 8

DETACHABLE POWER SUPPLY FOR INDUCTION TYPE ELECTROSTATIC SPRAY GUN

BACKGROUND OF THE INVENTION

The present invention relates, in general, to power supplies for electrostatic spray guns, and more particularly to a portable, light-weight, compact power pack formed as a replaceable component of an induction spray gun.

Electrostatic spray guns of various types and configurations are well known in the liquid spraying art and have long been used to spray various materials such as paints, insecticides, and the like. Recent improvements of such devices have been in the area of induction charging devices which serve to induce suitable charges on the spray particles produced by conventional spray guns, the improved devices operating at lower voltages and currents than previously was possible with the conventional corona discharge devices. Induction charging spray guns, to which the present invention has particular reference, are disclosed and claimed in copending application Ser. No. 548,958, of James E. Sickles, filed Feb. 11, 1975 and entitled "Improved Electrostatic Spray Coating Apparatus", and in application Ser. No. 634,386, of James E. Sickles, filed Nov. 24, 1975 and entitled "Electrostatic Spray Coating Apparatus", as well as in U.S. Pat. No. 4,073,002 issued on Feb. 7, 1978 James E. Sickles et al, and entitled "Self Adjusting Power Supply for Induction Charging Electrodes", all of which are assigned to the assignee of the present application.

A discussion of induction charging of spray particles may also be found in U.S. Pat. No. 3,698,635, issued on Oct. 17, 1972 to James E. Sickles. As set forth in the foregoing applications and patents, induction type spray guns have numerous advantages over the prior and conventional corona type spray guns. Principal among these advantages is the fact that the induction type spray gun operates at a substantially lower current and voltage level than does a corona device, induction spray guns utilizing voltages in the range of 10-25 kv and currents of about 1 to 5$\mu a$, while corona devices typically require voltages of 60 kv and up and currents of 50 to 200$\mu a$ or more. However, even with such an advantage, a spray gun having exposed electrodes carrying a voltage in the range of 15 kv presents certain handling problems, since a voltage in that range can produce arcing and similar effects. Where the power supply for a spray gun is a separate unit from the gun, it becomes necessary to utilize highly insulated electrical cables safely to conduct the required power to the gun. Such leads are relatively heavy and inflexible, particularly with high voltage corona-type devices, and make it difficult for the operator to handle the gun during a spray coating operation. Although the introduction of induction spray guns has reduced this problem considerably, because of the lower voltage and current requirements of such devices, nevertheless the problem remains, for even these lower voltage levels require substantial insulation for the lead-in cable and within the gun itself.

The power supplies used in the prior art typically are separate units which in order to provide the power levels required, have been extremely heavy, bulky and difficult to move, and have restricted the mobility of the spray gun operator to an area within reach of the high voltage cable leading from the power supply to the spray gun. The immobility of the power supply and the heavily insulated lead-in cable which is required by the prior art devices to provide relative safety in operation not only cause the spray gun to be awkward to handle, but increase the danger to the operator due to the possibility of breakdown of the insulation in the cable or in the power supply and consequent arcing and sparking problems.

SUMMARY OF THE INVENTION

It is, therefore, an object of the present invention to provide a small, compact, highly portable power supply for an electrostatic spray gun.

Another object of the invention is to provide an inexpensive and replaceable power supply which may be secured to a spray gun and which is sufficiently light in weight that the gun remains easily portable and simple to handle, thereby facilitating the use of the spray gun.

Another object of the invention is to provide a portable power supply which is light in weight, and small, and which may therefore be secured to an induction-type spray gun to convert a low input voltage to a high output voltage at or near the location of the induction charging device, thereby eliminating the need for high voltage lead-in cables.

A further object of the invention is the provision of an electrostatic spray gun having a lightweight, portable power supply mounted near the location of the induction charging device to minimize the length of high voltage cables required to supply the charging electrodes, thereby reducing the charge storage capacity of the high voltage end of the power supply and reducing spark intensity if the charging electrodes should be short circuited.

Briefly, the present invention is directed to a power pack for supplying a high voltage output to the charging electrodes of an induction charging device, the power pack being mounted on the spray gun itself or on an accessory attached to the spray gun such as a gas shroud forming chamber, proximate to the induction charging device. The power pack consists of appropriate circuitry encapsulated in an epoxy resin or other dielectric material that is molded to provide a suitable mounting case so that it may be mounted on the gun or the chamber accessory and be detachable therefrom for replacement purposes. The power pack is sufficiently small in size and light in weight that when it is connected to the gun it does not appreciably affect the handling characteristics thereof, and because this location eliminates the need for high voltage insulated input cables to the gun, in fact increases the mobility of the gun and facilitates its use.

The power pack consists of a voltage multiplier circuit which converts a low voltage input signal to a high voltage output, the circuit preferably being mounted on a printed circuit board for compactness and light weight. Because the nature of an induction spray gun permits operation at low power levels, the voltage and current requirements of the circuitry are such that the power pack can be relatively small in physical size and light in weight. The circuit board and its circuit connections are encapsulated in a suitable material such as an epoxy which is molded to provide a mounting case which may be secured to the exterior of a conventional spray gun, or to one that is suitably modified to receive the power pack as an integral, but detachable, part of the gun or as a part of an accessory to the gun. A low voltage line is fed into the spray gun, as by way of the air inlet line, and leads to suitable terminal contacts on the spray gun by which the low voltage is applied to the power pack when the power pack is connected to the gun. The output of the power pack appears at a high voltage output terminal which in a similar manner contacts a corresponding terminal formed on the spray gun whereby the output voltage may be conducted through a suitable high voltage lead to the high voltage electrode of the induction charging device secured to or forming a part of the spray gun.

This combination of a spray gun-mounted high voltage power pack and an induction charging means is a distinct improvement over the power supplies required for the high voltage corona effect devices of the prior art, for the power pack of the invention is simpler and requires less critical construction. This results in lower production costs of the power packs as well as permitting a lighter weight power supply. Because induction charging devices usually draw a current in the range of about 1 to 5 microamps, and require a voltage of about 5 to 25 kv, as compared to corona effect devices which draw output currents at the power supply in the range of 50–200 microamps or more and which typically require voltages of over 60 kv, the structural features of the invention could not be accomplished in the prior art.

In a preferred form of the invention, the power pack is mounted on a specially designed or modified spray gun, rather than upon a conventional, commercially available gun. Although the power pack can be molded in a proper shape for attachment to conventional guns, improved handling characteristics, as well as improved appearance, may be obtained by redesigning the spray gun to provide a receptacle adapted to receive the power pack module. Such an arrangement facilitates mounting of the power pack to the spray gun, and permits easy replacement of the power pack in case of failure of the unit in use. The resulting compactness, together with the ease of replacement of the power pack, makes the present unit extremely valuable for field use, permitting an operator to carry a spare unit with him and thereby virtually eliminating work stoppages due to a breakdown in the power supply of the gun.

In a further modification of the present invention, the power pack may be mounted on an accessory detachably secured to the spray gun. One such accessory, described in application Ser. No. 718,633 now abandoned filed Aug. 30, 1976 of James E. Sickles, is a cylindrical chamber adapted to be mounted around the spray nozzle and induction charging electrodes of an electrostatic spray gun. The chamber has an inlet for receiving a gas, such as nitrogen or humidity and temperature modified atmospheric air, and an outlet through which the gas exhausts as a protective envelope surrounding the charged spray stream emanating from the spray nozzle. The power pack of the present invention may be molded into a portion of the cylindrical casing of the chamber or can be removably secured in a receptacle formed in the chamber casing.

BRIEF DESCRIPTION OF THE DRAWINGS

The foregoing and additional objects, features and advantages of the present invention will become apparent to those of skill in the art from a consideration of the following detailed description of a preferred embodiment, taken with the accompanying drawings, in which:

FIG. 1 is a side elevation view of a spray gun adapted to receive the power supply of the present invention;

FIG. 2 is a sectional view of the spray gun taken along line 2—2 of FIG. 1;

FIG. 3 is an exploded view in partial section of a portion of the spray gun of FIG. 1;

FIG. 4 is a top view of a typical printed circuit board layout for the circuit of the present invention;

FIG. 5 is a sectional view of the power pack module taken along line 5—5 of FIG. 4.

FIG. 6 is a partial schematic diagram of a voltage multiplier circuit suitable for use in the present invention;

FIG. 7 is a side elevation view of a second form of spray gun incorporating the power pack of the invention; and FIG. 8 is a perspective view of another embodiment of the invention in which the power supply has been incorporated into a gas shroud forming accessory.

DESCRIPTION OF PREFERRED EMBODIMENTS

Turning now to a consideration of FIG. 1, there is illustrated one form of a hand-held electrostatic spray gun indicated generally at 10. The spray gun includes a handle portion 12, a barrel portion 14, and a manually operated trigger 16. The distal end of the barrel portion of the gun carries a spray-nozzle-and-air-cap 18 which are secured to the barrel by means of an annular nut 20, the nut being threaded onto suitable threads on the end of the barrel and being adapted to receive any one of the various spray nozzles that are commercially available, as well as nozzles particularly designed for the modified spray gun illustrated. The particular spray nozzle selected for use with the device will depend upon the spray pattern desired, the material being sprayed, and the like.

Located at the distal end of the barrel adjacent the nozzle 18 is an induction charging device 22 which includes a suitable electrode or electrode to which a high voltage is applied. This high voltage produces an electrostatic field within the induction charging device through which spray particles discharged from nozzle 18 must pass. As explained in copending application Ser. No. 548,958 now U.S. Pat. No. 4,009,829 and copending application Ser. No. 634,386 mentioned above, the electrostatic field induces on the spray particles an electric charge whereby the particles may be directed to a suitable target which is to be coated by the spray material. As set forth in the aforementioned applications, an average potential gradient in the range of 5 to 20 kilovolts per inch extending between the electrode of the induction charging device and the liquid outlet port of the spray nozzle is sufficient to induce charges on the spray particles.

The liquid to be sprayed is introduced into the gun 10 by way of a liquid conduit 24 which, in the embodiment of FIG. 1, enters the spray gun body at the bottom of handle portion 12, the liquid passing through suitable passageways in the handle and in the barrel. Suitable and conventional valving means operable by the trigger 16 controls the flow of liquid through the spray gun. In the preferred form of the invention, the liquid is supplied from a pressurized source which is maintained at ground electrical potential. By grounding the liquid supply, its handling is greatly facilitated, and the safety of the operator is enhanced. This contrasts with alternative forms wherein the high voltage supply is connected to the fluid source, and the external charging electrodes on the spray gun are maintained at ground potential.

Although the latter form is possible, the safety and handling problems involved in having a high voltage liquid supply make it generally unsuitable. Where the liquid supply is at ground potential, a grounding plate (not shown) may be provided in the fluid conduit at or near the spray nozzle in the manner described in the aforementioned copending applications.

The electrostatic spray gun 10 is capable of handling a variety of liquids, but has been found in the present embodiment to be particularly useful in spraying electrically conductive liquids such as water-based paints.

Although it is possible to operate an induction-type electrostatic spray gun in such a way that the spray particles are formed solely by the liquid pressure, in the preferred embodiment of the invention a source of air under pressure is also provided to assist in atomizing the liquid. Air under pressure is fed through air conduit 26 which enters the spray gun at the handle portion thereof, the air travelling through suitable passageways to the spray nozzle 18. In the preferred form, the air conduit is divided into two passageways 28 and 30 within the barrel portion of the spray gun, illustrated in FIG. 2. The air flow through passageway 30 is fed to corresponding passageways in the nozzle 18 leading to atomizing air outlet ports which may, for example, surround the liquid outlet ports in the nozzle. The air flow from these passageways serves to assist in the atomization of the liquid being discharged. The air flow through passageway 28 flows to corresponding passageways in the nozzle 18 which lead to fan discharge ports. The air flowing from these ports serves to shape the flow of air atomized particles to provide control and shaping of the spray pattern in the conventional manner.

As illustrated in FIGS. 2 and 3, the barrel portion 14 of spray gun 10 is formed, as by molding, from a suitable dielectric material, and its configuration is modified in accordance with the present invention to permit incorporation of a power pack 32 which includes an electrical power supply circuit to be described. In its modified form, the barrel 14 is shaped to form a receptacle 34 which is adapted to receive the power pack 32. The receptacle extends upwardly into the barrel portion, in the preferred form, and to accommodate this, the liquid and air passageways 24, 28 and 30 are located in side-by-side relationship along the top portion of the barrel, as may be seen in FIGS. 2 and 3. This arrangement of the passageways allows the modified barrel to be constructed with a small cross-sectional dimension to accommodate the power pack, resulting in a reduced weight for the gun barrel and making the spray gun easier to handle. Further, this arrangement allows the power pack to be constructed in an elongated, flat configuration which allows the use of a printed circuit board in constructing the electrical circuit for the power supply, thereby reducing the cost of the unit.

As may be seen in FIG. 3, the passageways 24, 28 and 30 preferably are aligned with each other across the midsection of the spray gun, but may be diverted in the distal end of the gun barrel, as at 36, to permit the passageways to be aligned with corresponding liquid and air passageways in conventional spray nozzles, thus insuring that the spray gun 10 will be compatible with such nozzles. As indicated in FIG. 3, the nozzle 18 abuts the end of barrel 14 and is secured in that position by the annular nut 20, the nut having an inwardly turned flange portion which engages the shoulder 38 of the nozzle to hold it in position. The inductive charging device 22 then fits over the annular nut, being held in position by a friction fit or by suitable fasteners. Suitable valving for the various passageways may be provided in the manner of conventional spray guns.

The power pack 32 is an elongated, flat package or module which is shaped to fit into the receptacle 34. The power pack may be secured in the receptacle by any suitable means, such as the screws 40 and 42 illustrated in the present embodiment. Preferably, the two screws pass through corresponding apertures 44 and 46 in the power pack and engage corresponding threaded apertures 48 and 50 in the barrel portion 14.

Power is supplied to the power pack 32 by way of a suitable lead-in cable 52 which, in accordance with the present invention, is a low voltage, low current cable, capable of supplying about 0.5 to 1.0 watt of direct current power at 11 volts from a battery supply. The cable 52 may be fed into the spray gun through the air conduit 26, if desired, or may be supplied through a separate passageway, and is connected through a suitable low voltage, low current switch 54 which is operable by means of trigger 16. Power cable 52 leads to a pair of low-voltage terminals 55 located at the surface of receptacle 34. Corresponding terminals 56 and 58 extend from the power pack to engage the terminals 55 when the power pack is secured in receptacle 34. Although the several terminals 55, 56 and 58 are shown as being surface mounted in FIG. 3, it will be apparent that suitable alternative forms, such as plug and socket arrangements, may be utilized, the structure shown in the drawings being for the purpose of illustration. Such alternate structures will be contructed to take into account the necessity for protecting the terminals from environmental conditions which may affect the electrical contact made therebetween and which could adversely affect the supply of power to the power pack.

The output voltage from the power pack 32 is supplied to a suitable terminal 59 located on an interior surface of the power pack, i.e., on a surface that will be in contact with the spray gun. In the preferred form of the invention, the terminal 59 is adapted to contact a corresponding terminal 60 mounted within receptacle 34. Again, these terminals are shown as being surface mounted but other forms of electrical contacts may be used, as desired. Terminal 60 is connected to a suitable high voltage cable 61 which may be molded within the barrel 14 to be insulated at least in part by the dielectric material of the barrel, and is adapted to provide a connection point by which the high voltage output from the power pack may be connected to the high voltage electrodes (not shown) on the induction charging device 22. This connection may be a permanent connection if the induction charging device is to be permanently secured to or forms an integral part of the spray gun, or may be by means of a screw terminal or the like, illustrated at 62, to permit interchanging of the induction charging devices if desired by the operator. The high voltage appearing at terminal 62 is connected by a suitable cable to the electrodes located on the interior of the induction charging device 22.

In an alternative form of the invention, contact 59 may be located on an exterior surface of the power pack and may take the form of a terminal screw or the like, adapted to receive a suitable cable for connecting the high voltage output from the power supply directly to the induction charging electrodes on the induction charging device 22.

The provision of electrical contacts for the electrical circuit of the spray gun 10, and the use of simple screw fasteners to secure the power pack to the gun permits easy and quick replacement of the power supply if it should fail in operation. Further, the construction used in the power pack is such that the unit is very inexpensive and thus allows disposability in the event problems arise. Thus, the improved power supply of the present invention has very low maintenance costs and permits fast repairs so that a minimum down time is experienced in the event of failure.

The power pack of the present invention is a low voltage, low current device and accordingly the circuit components may be conveniently mounted on a small, rectangular printed circuit board 64 as diagrammatically illustrated in FIG. 4. After assembly, the power supply, including the printed circuit board, the components mounted thereon, and the interconnections between the various elements may be encapsulated in a suitable dielectric material to form an insulating housing 66 surrounding the power supply. The encapsulation, or potting, of the electrical circuit protects it from damage by particulate material, vibration, shock, and other abuses which can occur during use of the spray gun. The epoxy material completely surrounds the circuit, as shown in FIG. 5, to thereby provide a strong, lightweight, low-maintenance power pack which is impervious to ambient conditions.

As illustrated in FIG. 6, the electrical circuit of the power supply is generally conventional in structure. The input terminals 56 and 58 receive DC power from a source of voltage which may, for example, be 11 volt nickel cadmium rechargeable batteries contained in a battery pack that may be easily carried by the operator of the gun to provide maximum portability for the device. The battery pack preferably has a capacity of 0.5 to 1.0 ampere-hours to provide up to 10 hours of continuous operation, and is connected by way of cable 52 to the terminals 56 and 58.

The DC voltage derived from the power supply is used to drive a conventional oscillator 68 which may, for example, be of the Colpitts type. The output of the oscillator is fed through the primary winding 69 of the transformer 70 having an annular ferrite core 71 (FIG. 4). The secondary winding 72 of the transformer supplies an alternating output voltage to a multistage voltage multiplier-rectifier network 74 of conventional construction, with the output of the voltage multiplier being fed across a shunt resistor 76 to a series regulating resistor 78. The function and purpose of resistors 76 and 78 is set forth in greater detail in the aforementioned U.S. Pat. No. 4,073,002.

Although it is generally preferred to drive the power pack by a DC voltage, it will be apparent that a low-level AC voltage may be utilized if desired. In such a case, the oscillator 68 may be omitted from the circuit and the low-voltage AC applied to the primary winding 69 of the transformer 70. The transformed AC will then appear across the input to the voltage multiplier-rectifier network 74 to provide the DC voltage required to drive the induction charging device.

The output voltage appearing on output terminal 59 will be in the range of 5 to 25 kilovolts, depending upon the requirements of the induction charging device. Although the construction of the power supply circuit is generally conventional, it should be noted that the use of a ferrite core in this arrangement has several advantages. First, the core is of relatively small size and thus is well adapted to the construction of a small, lightweight, disposable power pack. Further, the ferrite core acts as a current limiter to prevent heavy current flow in the event that the charging electrodes should become short circuited. As set forth in the aforementioned U.S. Pat. No. 4,073,002, resistors 76 and 78 will tend to regulate the voltage applied to the charging electrode during normal use. However, if a short circuit condition should suddenly be imposed, the tendency of the power supply to produce a heavy current flow will, at a certain level, load the ferrite transformer 70 to a point where the transformer core will saturate so that there will be no feedback to the oscillator 68, thus cutting off the oscillator and cutting off the flow of short-circuit current. This provides a built-in safety factor for the system. In a preferred form of the invention, the power pack is designed to produce between 0 and 20 microamps at 25 to 10 kv on the output terminal 59 with corresponding input currents of 50 milliamps when there is no load and 100 milliamps when the output is at 20 microamps, the input being at 11 volts DC.

As indicated above, where a battery pack is used, it may conveniently be carried by the operator; alternatively, it may be secured to the liquid supply tank or air pressure tank. The low voltage line 52 is connected through the low voltage switch 54 which is operated by the trigger 16, as has been explained. For safety in operation, the trigger 16 first activates the air flow through the gun, then turns the power supply on by means of switch 54 at the same time the control valve for the fluid to be sprayed is opened. Similarly, the release of trigger 16 turns off the power supply and the liquid supply, and thereafter turns the air flow off. Because a low voltage is supplied to the power supply circuit, the high voltage cable of the prior art is eliminated; for the same reason, the expensive high voltage switching required in prior devices is eliminated, and a simple, inexpensive low voltage switch may be used, thus substantially reducing the costs of the spray gun of the present invention and increasing its flexibility, portability, and ease of use.

Because the power pack is molded in an epoxy material it can take a variety of shapes, and thus can be adapted for connection to spray guns of different sizes and configurations, enabling the spray gun to be shaped for maximum handling ability. It has been found that a short barrel portion is desirable in a spray gun to facilitate the operator's use of the gun, and the induction charging apparatus provides this by elimination of the forward extending corona electrode found on many prior spray guns. This provision of a short barrel is further accomplished through the form of the invention illustrated in FIG. 7, wherein the power pack 32' is mounted in the handle portion 80 of an otherwise conventional spray gun 82. In this type of gun, the liquid to be sprayed is fed through a fluid inlet conduit 84 located at the forward end of the gun, while air is supplied through a conduit 86 in the handle. Operation of the spray gun is by means of a trigger 88 which operates a fluid flow valve generally indicated at 90 and, at the same time, controls the flow of air by means of a switch 92. Electrical power is supplied to the power pack 32' by means of a low voltage conductor 94 leading into the handle portion of the spray gun, while the high voltage output from the power pack leads through the gun to a high voltage terminal such as the terminal screw 96. The high voltage terminal provides a connection to the electrodes of the inductive charging device 98 which is suitably secured to the exterior of the nozzle securing nut 100. The power pack 32' may be molded to fit the shape of the handle of the spray gun 82 and may be secured in place by means of screws 102 and 104, or by other suitable means.

In an alternate embodiment shown in FIG. 8, cylindrical chamber 110 has an inlet 112 and an outlet 114 defined by an annular end portion 116 and spray nozzle 18. Disposed within outlet 114 is a porous electrode 120 comprising a screen-like conductive material which serves as an induction charging electrode for the spray particles emanating from nozzle 18. In the manner described in greater detail in the aforementioned co-pending application Ser. No. 718,633, a gas received at inlet 112 is formed by the chamber into a shroud which exhausts through outlet 114 and which substantially envelopes the spray stream. The envelope provides an artificial atmosphere which may protect the spray particles from reacting with the ambient atmosphere or from being adversely affected to too high or too low ambient humidity.

The portable power supply of the present invention is well suited to incorporation into the cylindrical gas shroud forming chamber. As shown in FIG. 8, chamber 110 has a recess 122 in which power pack 32 may be detachably secured with screws 40 and 42, in a manner described hereinabove for power pack 32 mounted in receptacle 34 of barrel 14. Illustrated in diagrammatic form are suitable low voltage connecting means 124 between a power source and the power pack 32 and between the power pack and induction charging electrode 120 which are provided in a manner similar to that described for the power pack mounted in barrel portion 14.

Thus there has been described a new and improved power supply for use with electrostatic spray guns. The power supply is light in weight, relatively inexpensive to build, and may be mounted directly on the spray gun to form an integral part thereof, but is easily replaceable in the event of failure. The small size and light weight of the device and the fact that a low voltage input cable is used reduces by a substantial amount the weight and bulk of the spray gun, and allows easy handling by the operator. The use of a battery-supplied power pack makes the gun easily portable, and serves to reduce operator fatigue while at the same time decreasing down time of the device if the power supply should fail; thus operator productivity is increased. Although the invention has been shown in terms of specific embodiments, it will be understood that the illustrations are merely exemplary, with the true spirit and scope of the invention being limited only by the following claims.

What is claimed is:

1. An electrostatic spray apparatus including, in combination:

a spray gun having a barrel portion and at least one fluid passageway for the fluid to be sprayed;

a nozzle means secured to said barrel for receiving said fluid and for discharging said fluid in a spray;

induction charging means adjacent said spray discharge nozzle;

a small, light-weight power pack module incorporating a power supply for said induction charging means, said power supply being operative to produce a high voltage, low current DC output from a low voltage, low current input;

means for detachably securing said power pack to module to said spray gun in operative electrical connection with said induction charging means.

2. The apparatus of claim 1, wherein said spray gun barrel portion incorporates an exterior receptacle for receiving said power pack module, said power pack module being removably secured in said receptacle in the event replacement of the power pack is module required.

3. The apparatus of claim 1, wherein said spray gun barrel portion is further characterized by chamber means mounted on said barrel portion, said chamber means adapted to provide a gaseous envelope for said fluid spray discharged from said nozzle means, said power pack module being removably secured to the chamber means.

4. The apparatus of claim 1 wherein said means for securing said power pack module to said spray gun in operative electrical connection with said induction charging means comprises first corresponding contacts on said spray gun and on said power pack module for connecting a low voltage, low current power source to said power pack module, and further comprises second corresponding contacts on said spray gun and on said power pack module for connecting the high-voltage, low current output of said power pack module to conductor means in said spray gun.

5. The apparatus of claim 4, wherein said electrical contact means further includes input power cable means leading from an external power source through said spray gun to said first corresponding contacts, said input power cable means being a lower voltage, low current cable.

6. The apparatus of claim 5, wherein said power supply comprises a voltage multiplier circuit mounted on a printed circuit board, said circuit and circuit board being encapsulated in a dielectric material to form said power pack module, and wherein said dielectric material is shaped to form a housing adapted to be secured to said spray gun.

7. The apparatus of claim 6, wherein said spray gun barrel portion incorporates an exterior receptacle for receiving said power pack module, said power pack module being removably secured in said receptacle and adapted for easy removal therefrom in the event replacement is required, and wherein said electrical contact means on said spray gun are located in said receptacle.

8. The apparatus of claim 7, wherein said means for securing said power pack module to said spray gun comprises fastener means adapted to draw said power pack module into said receptacle to cause said electrical contacts on said power pack module to engage said corresponding electrical contacts in said receptacle.

9. The apparatus of claim 6, wherein said spray gun handle incorporates an exterior receptacle for receiving said power pack module, said power pack module being removably secured in said receptacle and adapted for easy removal therefrom in the event replacement is required, and wherein said contact means on said spray gun are located in said receptacle.

10. The apparatus of claim 6, wherein said power source is a low voltage, low current DC source, and wherein said power supply comprises oscillator means for converting said low voltage, low current DC to an alternating current and a voltage multiplier responsive to said alternating current for producing a DC output having a high voltage and a low current.

11. The apparatus of claim 10, wherein said power pack module is supplied from a source of direct current rated at between 0.5 to 1 watt power, and wherein the output of said power pack module provides 10 to 25 kilovolts to said induction charging device.

12. An electrostatic spray apparatus including, in combination:
a spray gun having a barrel portion and at least one liquid passageway for conveying liquid to be sprayed;
nozzle means secured to said barrel portion for receiving said liquid and for discharging said liquid in a spray;
induction charging means for producing an electric field in which spray particles are formed by said nozzle means;
a small, light-weight power pack module incorporating a power supply for said induction charging means, said power supply being operative to produce a high voltage, low current DC output from a low voltage, low current input; and
means for detachably securing said power pack module to said spray gun in operative electrical connection with said induction charging means.

13. An electrostatic spray apparatus including, in combination:
a spray gun having a barrel portion and at least one liquid passageway for conveying liquid to be sprayed;
nozzle means secured to said barrel portion for receiving said liquid and for discharging said liquid in a spray;
induction charging means disposed radially outwardly and exteriorly of said nozzle means;
a small, light-weight power pack module incorporating a power supply for said induction charging means, said power supply being operative to produce a high voltage, low current DC output from a low voltage, low current input; and
means for detachably securing said power pack module to said spray gun in operative electrical connection with said induction charging means.

14. An electrostatic spray apparatus including, in combination:
a spray gun having a barrel portion and at least one fluid passageway for the fluid to be sprayed;
a nozzle means secured to said barrel for receiving said fluid and for discharging said fluid in a spray;
induction charging means adjacent said spray discharge nozzle;
a small, light-weight power pack incorporating a power supply for said induction charging means, said power supply being operative to produce a high voltage, low current DC output from a low voltage, low current input;
means for securing said power pack to said spray gun in operative electrical connection with said induction charging means;
wherein said spray gun barrel portion incorporates an exterior receptacle for receiving said power pack, said power pack being removably secured in said receptacle in the event replacement of the power pack is required.

15. An electrostatic spray apparatus including, in combination:
a spray gun having a barrel portion and at least one fluid passageway for the fluid to be sprayed;
a nozzle means secured to said barrel for receiving said fluid and for discharging said fluid in a spray;
induction charging means adjacent said spray discharge nozzle;
a small, light-weight power pack incorporating a power supply for said induction charging means, said power supply being operative to produce a high voltage, low current DC output from a low voltage, low current input;
means for securing said power pack to said spray gun in operative electrical connection with said induction charging means;
wherein said spray gun barrel portion is further characterized by chamber means mounted on said barrel portion, said chamber means adapted to provide a gaseous envelope for said fluid spray discharge from said nozzle means, said power pack being removably secured to the chamber means.

* * * * *